United States Patent
Kaneko

(10) Patent No.: US 12,064,998 B2
(45) Date of Patent: Aug. 20, 2024

(54) TIRE

(71) Applicant: The Yokohama Rubber Co., LTD., Tokyo (JP)

(72) Inventor: Takeshi Kaneko, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 0 days.

(21) Appl. No.: 17/546,918

(22) Filed: Dec. 9, 2021

(65) Prior Publication Data

US 2022/0185027 A1   Jun. 16, 2022

(30) Foreign Application Priority Data

Dec. 15, 2020 (JP) ................. 2020-207863

(51) Int. Cl.
*B60C 11/13* (2006.01)
*B60C 3/04* (2006.01)
*B60C 11/03* (2006.01)

(52) U.S. Cl.
CPC ............ *B60C 11/13* (2013.01); *B60C 3/04* (2013.01); *B60C 2011/0353* (2013.01); *B60C 2011/0381* (2013.01)

(58) Field of Classification Search
CPC ....... B60C 11/0304; B60C 11/13; B60C 3/04; B60C 2011/0353; B60C 2011/0381;
(Continued)

(56) References Cited

U.S. PATENT DOCUMENTS 4,305,445 A * 12/1981 Yoshioka ............... B60C 11/04
152/526
7,140,410 B2   11/2006 Helt et al.
(Continued)

FOREIGN PATENT DOCUMENTS

JP     03010909 A  *  1/1991
JP     03231001 A  * 10/1991
(Continued)

OTHER PUBLICATIONS

Ikeki, English Machine Translation of JP 2015058912, 2015 (Year: 2015).*
(Continued)

*Primary Examiner* — Justin R Fischer
*Assistant Examiner* — Brendon Charles Darby
(74) *Attorney, Agent, or Firm* — Thorpe North & Western

(57) ABSTRACT

In a tire, each of first and second circumferential grooves include groove portions arranged discontinuously in a row in a circumferential direction. The groove portions are arranged in a staggered manner in the circumferential direction. A distance D1 from an equatorial plane to a center line of the first circumferential groove and a distance D2 from the equatorial plane to a center line of the second circumferential groove satisfy 0.90≤D2/D1≤1.10. A maximum groove width W1 of the groove portion of the first circumferential groove and a maximum groove width W2 of the groove portion of the second circumferential groove satisfy 0.90≤W2/W1≤1.10. A maximum circumferential length L1 of the groove portion of the first circumferential groove and a maximum circumferential length L2 of the groove portion of the second circumferential groove satisfy 0.90≤L2/L1≤1.10.

17 Claims, 6 Drawing Sheets

(58) Field of Classification Search
CPC .............. B60C 11/0323; B60C 11/1281; B60C 11/032; B60C 11/0311; B60C 11/04
See application file for complete search history.

(56) References Cited

U.S. PATENT DOCUMENTS

| | | | |
|---|---|---|---|
| 2014/0290814 A1* | 10/2014 | Audigier | B60C 11/0306 264/279.1 |
| 2014/0290820 A1* | 10/2014 | Hatanaka | B60C 11/1236 152/454 |
| 2015/0059943 A1* | 3/2015 | Radulescu | B60C 11/04 152/209.17 |
| 2015/0114536 A1* | 4/2015 | Hamanaka | B60C 11/1392 152/209.18 |
| 2015/0321519 A1* | 11/2015 | Obana | B60C 11/0083 152/209.18 |
| 2019/0135052 A1 | 5/2019 | Ogawa et al. | |
| 2019/0366773 A1 | 12/2019 | Vaissaud | |
| 2022/0016929 A1* | 1/2022 | Nakata | B60C 11/03 |
| 2022/0048336 A1* | 2/2022 | Domprobst | B60C 11/032 |

FOREIGN PATENT DOCUMENTS

| | | | |
|---|---|---|---|
| JP | H05-201202 A | 1/1992 | |
| JP | H05-201202 A | 8/1993 | |
| JP | 2812999 B2 * | 10/1998 | ........... B60C 11/032 |
| JP | 2001-233018 A | 8/2001 | |
| JP | 2014-084004 A | 5/2014 | |
| JP | 2015058912 A * | 3/2015 | |
| JP | 2016-165934 A | 9/2016 | |
| JP | 2017-197153 A | 11/2017 | |

OTHER PUBLICATIONS

Yamaguchi, English Machine Translation of JP 28129999, 1998 (Year: 1998).*

Yokoyama, English Machine Translation of JP H0310909A, 1991 (Year: 1991).*

Ikeda, English Machine Translation of JP H03231001 A, 1991 (Year: 1991).*

* cited by examiner

| CONFIGURATION OF CIRCUMFERENTIAL GROOVE | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|
| | FIG. 6 | FIG. 2 | FIG. 2 | FIG. 2 | FIG. 2 | FIG. 2 | FIG. 2 | FIG. 2 | FIG. 2 | FIG. 2 | FIG. 2 |
| D1/TW | 0.10 | 0.10 | 0.15 | 0.23 | 0.28 | 0.33 | 0.40 | 0.45 | 0.23 | 0.23 | 0.23 |
| D2/D1 | 1.00 | 1.00 | 1.00 | 1.00 | 1.00 | 1.00 | 1.00 | 1.00 | 1.00 | 1.00 | 1.00 |
| Dg/TW | 0.20 | 0.20 | 0.30 | 0.46 | 0.56 | 0.66 | 0.80 | 0.90 | 0.46 | 0.46 | 0.46 |
| W1/TW | 0.100 | 0.100 | 0.100 | 0.100 | 0.100 | 0.100 | 0.100 | 0.100 | 0.100 | 0.100 | 0.100 |
| W2/W1 | 1.00 | 1.00 | 1.00 | 1.00 | 1.00 | 1.00 | 1.00 | 1.00 | 1.00 | 1.00 | 1.00 |
| P1/TL | - | 0.020 | 0.020 | 0.020 | 0.020 | 0.020 | 0.020 | 0.020 | 0.030 | 0.040 | 0.050 |
| P2/TL | - | 0.020 | 0.020 | 0.020 | 0.020 | 0.020 | 0.020 | 0.020 | 0.030 | 0.040 | 0.050 |
| L1/P1 | - | 0.20 | 0.20 | 0.20 | 0.20 | 0.20 | 0.20 | 0.20 | 0.20 | 0.20 | 0.20 |
| L2/P2 | - | 0.20 | 0.20 | 0.20 | 0.20 | 0.20 | 0.20 | 0.20 | 0.20 | 0.20 | 0.20 |
| L2/L1 | - | 1.00 | 1.00 | 1.00 | 1.00 | 1.00 | 1.00 | 1.00 | 1.00 | 1.00 | 1.00 |
| φ/P1 | - | 0.20 | 0.20 | 0.20 | 0.20 | 0.20 | 0.20 | 0.20 | 0.20 | 0.20 | 0.20 |
| A1/Sa | 0.100 | 0.020 | 0.020 | 0.020 | 0.020 | 0.020 | 0.020 | 0.020 | 0.020 | 0.020 | 0.020 |
| A2/Sa | 0.100 | 0.020 | 0.020 | 0.020 | 0.020 | 0.020 | 0.020 | 0.020 | 0.020 | 0.020 | 0.020 |
| A1+A2 > Sa | 0.200 | 0.040 | 0.040 | 0.040 | 0.040 | 0.040 | 0.040 | 0.040 | 0.040 | 0.040 | 0.040 |
| DRY PERFORMANCE | 100 | 104 | 104 | 104 | 105 | 105 | 106 | 106 | 101 | 101 | 101 |
| WET PERFORMANCE | 100 | 99 | 101 | 101 | 102 | 102 | 103 | 103 | 100 | 100 | 100 |

FIG. 4

| | EXAMPLE 11 | EXAMPLE 12 | EXAMPLE 13 | EXAMPLE 14 | EXAMPLE 15 | EXAMPLE 16 | EXAMPLE 17 | EXAMPLE 18 | EXAMPLE 19 | EXAMPLE 20 | EXAMPLE 21 | EXAMPLE 22 |
|---|---|---|---|---|---|---|---|---|---|---|---|---|
| CONFIGURATION OF CIRCUMFERENTIAL GROOVE | FIG. 2 | FIG. 2 | FIG. 2 | FIG. 2 | FIG. 2 | FIG. 2 | FIG. 2 | FIG. 2 | FIG. 2 | FIG. 2 | FIG. 2 | FIG. 2 |
| D1/TW | 0.23 | 0.23 | 0.23 | 0.23 | 0.23 | 0.23 | 0.23 | 0.23 | 0.23 | 0.23 | 0.23 | 0.23 |
| D2/D1 | 1.00 | 1.00 | 1.00 | 1.00 | 1.00 | 1.00 | 1.00 | 1.00 | 1.00 | 1.00 | 1.00 | 1.00 |
| Dg/TW | 0.46 | 0.46 | 0.46 | 0.46 | 0.46 | 0.46 | 0.46 | 0.46 | 0.46 | 0.46 | 0.46 | 0.46 |
| W1/TW | 0.050 | 0.040 | 0.033 | 0.040 | 0.040 | 0.040 | 0.040 | 0.050 | 0.034 | 0.030 | 0.040 | 0.040 |
| W2/W1 | 1.00 | 1.00 | 1.00 | 1.00 | 1.00 | 1.00 | 1.00 | 1.00 | 1.00 | 1.00 | 1.00 | 1.00 |
| P1/TL | 0.040 | 0.040 | 0.040 | 0.040 | 0.040 | 0.040 | 0.040 | 0.040 | 0.040 | 0.040 | 0.040 | 0.040 |
| P2/TL | 0.040 | 0.040 | 0.040 | 0.040 | 0.040 | 0.040 | 0.040 | 0.040 | 0.040 | 0.040 | 0.040 | 0.040 |
| L1/P1 | 0.40 | 0.50 | 0.60 | 0.50 | 0.50 | 0.50 | 0.50 | 0.50 | 0.50 | 0.50 | 0.43 | 0.38 |
| L2/P2 | 0.40 | 0.50 | 0.60 | 0.50 | 0.50 | 0.50 | 0.50 | 0.50 | 0.50 | 0.50 | 0.43 | 0.38 |
| φ/P1 | 1.00 | 1.00 | 1.00 | 1.00 | 1.00 | 1.00 | 1.00 | 1.00 | 1.00 | 1.00 | 1.00 | 1.00 |
| φ/P1 | 0.20 | 0.20 | 0.20 | 0.30 | 0.40 | 0.50 | 0.60 | 0.50 | 0.50 | 0.50 | 0.50 | 0.50 |
| A1/Sa | 0.020 | 0.020 | 0.020 | 0.020 | 0.020 | 0.020 | 0.020 | 0.025 | 0.017 | 0.015 | 0.017 | 0.015 |
| A2/Sa | 0.020 | 0.020 | 0.020 | 0.020 | 0.020 | 0.020 | 0.020 | 0.025 | 0.017 | 0.015 | 0.017 | 0.015 |
| A1+A2 > Sa | 0.040 | 0.040 | 0.040 | 0.040 | 0.040 | 0.040 | 0.040 | 0.050 | 0.034 | 0.030 | 0.034 | 0.030 |
| DRY PERFORMANCE | 100 | 100 | 99 | 100 | 100 | 100 | 100 | 101 | 103 | 103 | 103 | 103 |
| WET PERFORMANCE | 102 | 103 | 104 | 103 | 104 | 104 | 104 | 103 | 103 | 101 | 103 | 101 |

FIG. 5

CONVENTIONAL EXAMPLE

TIRE

CROSS-REFERENCE TO RELATED APPLICATIONS

This application claims priority pursuant to 35 U.S.C. 119(a) to Japan Patent Application No. 2020-207863, filed Dec. 15, 2020, which application is incorporated herein by reference in its entirety.

TECHNICAL FIELD

The technology relates to a tire and particularly relates to a tire that can provide dry performance and wet performance of a tire in a compatible manner.

BACKGROUND ART

Racing tires used both for public road running and for circuit running are required to include circumferential grooves in a tread contact surface in order to ensure wet performance of the tire. As a known tire employing the structure as described above, a technology described in U.S. Pat. No. 7,140,410 is known.

SUMMARY

The technology provides a tire that can provide dry performance and wet performance of a tire in a compatible manner.

An embodiment of the technology provides a tire comprising a first circumferential groove and a second circumferential groove disposed in a left region and a right region demarcated by a tire equatorial plane, each of the first circumferential groove and the second circumferential groove comprising a plurality of groove portions arranged discontinuously in a row in a tire circumferential direction, the groove portions of the first circumferential groove and the groove portions of the second circumferential groove being arranged in a staggered manner in the tire circumferential direction, a distance D1 from the tire equatorial plane to a groove center line of the first circumferential groove and a distance D2 from the tire equatorial plane to a groove center line of the second circumferential groove having a relationship $0.90 \leq D2/D1 \leq 1.10$, a maximum groove width W1 of the first circumferential groove and a maximum groove width W2 of the second circumferential groove having a relationship $0.90 \leq W2/W1 \leq 1.10$, and a maximum circumferential length L1 of the groove portion of the first circumferential groove and a maximum circumferential length L2 of the groove portion of the second circumferential groove having a relationship $0.90 \leq L2/L1 \leq 1.10$.

In the tire according to an embodiment of the technology, (1) each of the first and second circumferential grooves extends intermittently in the tire circumferential direction, and thus compared with a configuration in which the circumferential grooves extend continuously in the tire circumferential direction, the configuration described above has an advantage in that the traction performance of the tire is improved. Additionally, (2) the first and second circumferential grooves are disposed at distances that are substantially identical, to the tire equatorial plane, and thus compared with a configuration in which the first and second circumferential grooves are disposed left-right asymmetrically, the configuration described above has an advantage in that for example, the average travel time is stable on a traveling course such as a circuit which requires cornering in both left and right directions. Additionally, (3) the groove portions constituting the first and second circumferential grooves have the maximum groove widths W1, W2 that are substantially identical and the maximum circumferential lengths L1, L2 that are substantially identical, and thus compared with a configuration in which the groove portions have non-uniform groove widths and groove lengths, the configuration described above has an advantage in that for example, the average travel time is stable on the traveling course such as a circuit which requires cornering in both left and right directions.

BRIEF DESCRIPTION OF DRAWINGS

FIG. 4 is a table showing the results of performance tests of tires according to an embodiment of the technology.

FIG. 5 is a table showing the results of performance tests of tires according to an embodiment of the technology.

DETAILED DESCRIPTION

Embodiments of the technology will be described in detail below with reference to the drawings. Note that embodiments of the technology are not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Tire

Figure 1:
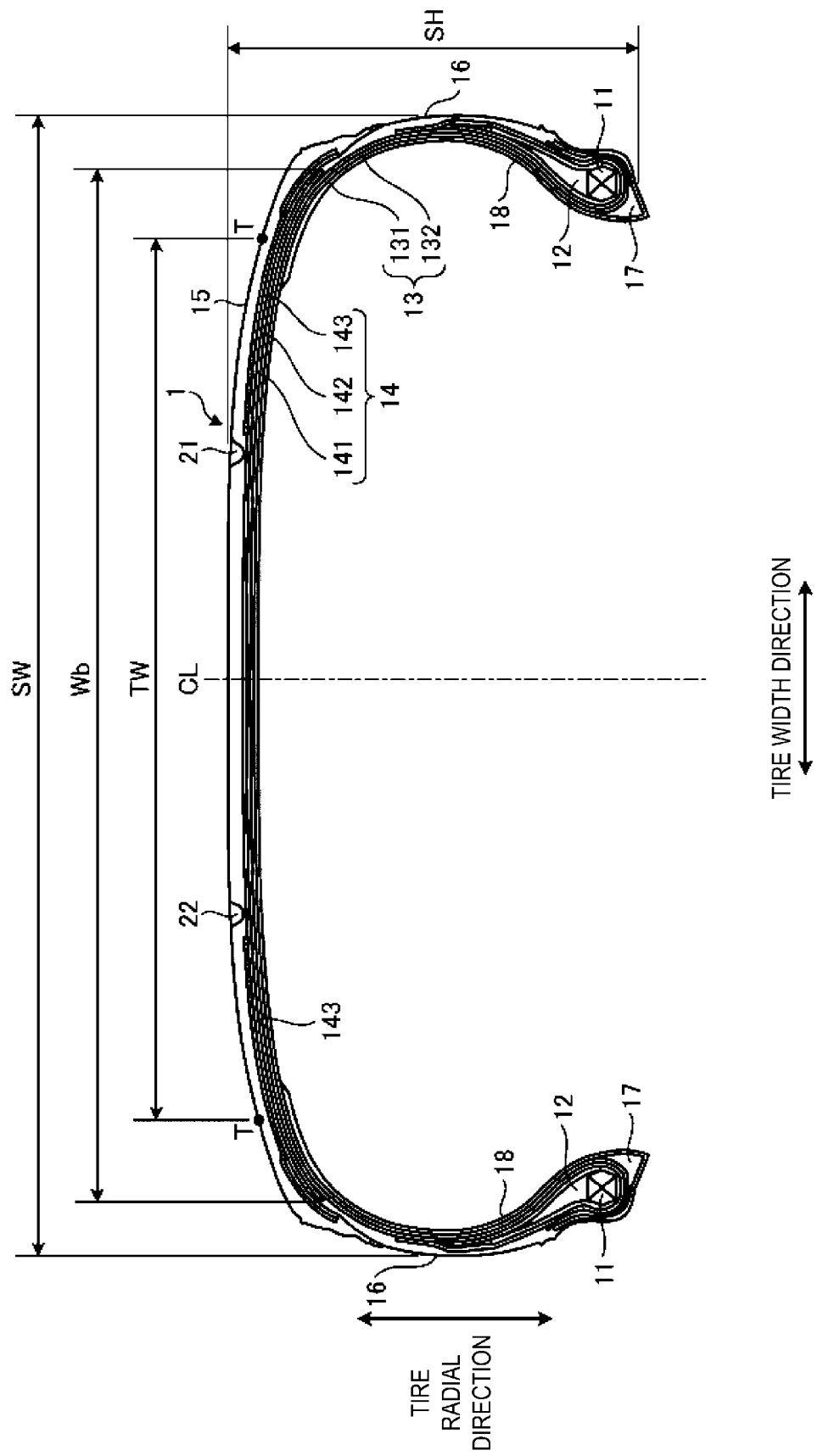
FIG. 1 is a cross-sectional view in a tire meridian direction illustrating a tire according to an embodiment of the technology.

FIG. 1 is a cross-sectional view in a tire meridian direction illustrating a tire according to an embodiment of the technology. The same drawing illustrates a cross-sectional view of a half region in a tire radial direction. In this embodiment, a racing pneumatic radial tire used both for public road running and for circuit running will be described as an example of the tire.

In the same drawing, a cross section in the tire meridian direction is defined as a cross section of the tire taken along a plane that includes a tire rotation axis (not illustrated). Further, a tire equatorial plane CL is defined as a plane perpendicular to the tire rotation axis through a midpoint between measurement points in a tire cross-sectional width defined by JATMA (the Japan Automobile Tyre Manufacturers Association, Inc.). Additionally, a tire width direction is defined as a direction parallel to the tire rotation axis, and the tire radial direction is defined as a direction perpendicular to the tire rotation axis.

A tire 1 includes an annular structure with the tire rotation axis serving as the center, and includes a pair of bead cores 11, 11, a pair of bead fillers 12, 12, a carcass layer 13, a belt layer 14, a tread rubber 15, a pair of sidewall rubbers 16, 16, a pair of rim cushion rubbers 17, 17, and an innerliner 18 (see FIG. 1).

The pair of bead cores 11, 11 each include one or more of bead wires made of steel and made by being wound annularly multiple times, and the pair of bead cores 11, 11 are embedded in bead portions and constitute cores of the bead portions on the left and right. The pair of bead fillers 12, 12 are respectively disposed on an outer circumference of the pair of bead cores 11, 11 in the tire radial direction and reinforce the bead portions.

The carcass layer 13 includes a single layer structure made of one carcass ply, or a multilayer structure made of a plurality of carcass plies being layered, and the carcass layer 13 extends in a toroidal shape between the bead cores 11, 11 on the left and right, and constitutes the backbone of the tire. Additionally, both end portions of the carcass layer 13 are wound and turned back toward an outer side in the tire width direction to wrap the bead cores 11 and the bead fillers 12, and are fixed. Moreover, the carcass ply of the carcass layer 13 is made by covering a plurality of carcass cords made of steel or an organic fiber material (for example, aramid, nylon, polyester, rayon, or the like) with a coating rubber and performing a rolling process on the carcass cords, and has a cord angle (defined as an inclination angle in a longitudinal direction of the carcass cords with respect to a tire circumferential direction) of 80 degrees or more and 100 degrees or less.

Note that in the configuration in FIG. 1, the carcass layer 13 includes a multilayer structure made by layering two carcass plies 131, 132. However, no such limitation is intended, and the carcass layer 13 may be constituted by layering three or more carcass plies or may include a single layer structure made of one carcass ply (not illustrated).

The belt layer 14 is a multilayer structure including a plurality of belt plies 141 to 143 and is disposed around the periphery of the carcass layer 13. The belt plies 141 to 143 include a pair of cross belts 141, 142 and a pair of belt covers 143, 143.

The pair of cross belts 141, 142 are made by covering a plurality of belt cords made of steel or an organic fiber material with a coating rubber and performing a rolling process on the belt cords, and each have a cord angle with an absolute value of 15 degrees or more and 55 degrees or less. Further, the pair of cross belts 141, 142 have cord angles (defined as inclination angles in a longitudinal direction of the belt cords with respect to the tire circumferential direction) of opposite signs relative to each other and are layered such that the longitudinal directions of the belt cords intersect each other (so-called crossply structure). Furthermore, the pair of cross belts 141, 142 are disposed layered on an outer side in the tire radial direction of the carcass layer 13.

The belt cover 143 is made by coating belt cover cords made from steel or an organic fiber material with a coating rubber and has a cord angle, as an absolute value, of 0° or more and 10° or less. Additionally, the belt cover 143 is, for example, a strip material formed by coating one or a plurality of belt cover cords with a coating rubber, where the strip material is formed by winding the strip material spirally on the outer circumferential surfaces of the cross belts 141 and 142 multiple times in the tire circumferential direction. Additionally, in the configuration in FIG. 1, the belt covers 143, 143 are disposed covering lateral edges of the cross belts 141, 142 from the outer side in the tire radial direction. However, no such limitation is intended, and the belt cover 143 may be disposed in such a manner as to completely cover the cross belts 141, 142 (not illustrated).

The tread rubber 15 is disposed in the outer circumferences in the tire radial direction of the carcass layer 13 and the belt layer 14 and constitutes a tread portion of the tire. The pair of sidewall rubbers 16, 16 are disposed on an outer side in the tire width direction of the carcass layer 13 and constitute sidewall portions on the left and right, respectively. The pair of rim cushion rubbers 17, 17 extend from an inner side in the tire radial direction of the bead cores 11, 11 on the left and right and turned back portions of the carcass layer 13 toward the outer side in the tire width direction, and constitute rim fitting surfaces of the bead portions. The innerliner 18 is an air permeation preventing layer disposed on the tire inner surface and covering the carcass layer 13, and suppresses oxidation caused by exposure of the carcass layer 13 and also prevents leaking of the air in the tire.

Additionally, in FIG. 1, a tire cross-sectional height SH has the relationship $0.20 \leq SH/SW \leq 0.70$ and preferably has the relationship $0.30 \leq SH/SW \leq 0.60$, with respect to a total tire width SW. In addition, a tire ground contact width TW has the relationship $0.90 \leq TW/SW \leq 0.98$ and preferably has the relationship $0.94 \leq TW/SW \leq 0.96$, with respect to the total tire width SW. Additionally, a belt width Wb of the cross belt 141, which is wide, has the relationship $0.98 \leq Wb/TW \leq 1.10$ and preferably has the relationship $1.00 \leq Wb/TW \leq 1.0.5$, with respect to the tire ground contact width TW.

The tire cross-sectional height SH is a distance equal to half of a difference between a tire outer diameter and a rim diameter, and is measured when the tire is mounted on a specified rim, inflated to a specified internal pressure, and in an unloaded state.

The total tire width SW is measured as a linear distance (including all portions such as letters and patterns on the tire side surface) between the sidewalls when the tire is mounted on a specified rim, inflated to a specified internal pressure, and in an unloaded state.

The tire ground contact width TW is measured as a maximum linear distance in the tire axial direction of a contact surface of the tire and a flat plate when the tire is mounted on a specified rim, inflated to a specified internal pressure, placed perpendicular to the flat plate in a static state, and loaded with a load corresponding to a specified load.

A tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

The width of a belt ply is the distance in the direction of the tire rotation axis between the left and right end portions of each belt ply, measured when the tire is mounted on a specified rim, inflated to a specified internal pressure, and in an unloaded state.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a tire for a passenger vehicle, the specified internal pressure is an air pressure of 180 kPa, and the specified load is 88% of the maximum load capacity.

Tread Surface

Figure 2:
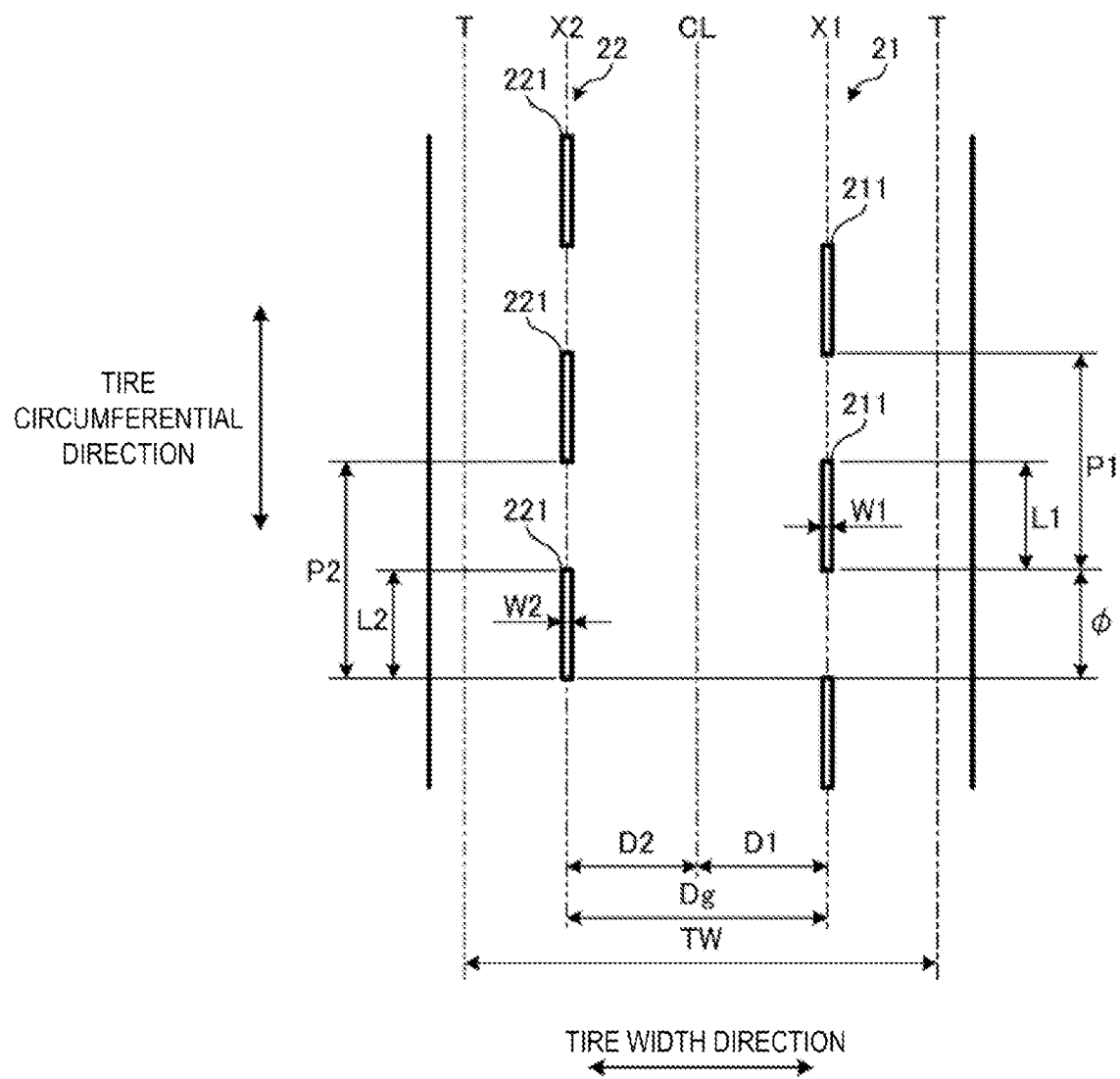
FIG. 2 is a plan view illustrating a tread surface of the tire illustrated in FIG. 1.
Figure 3:
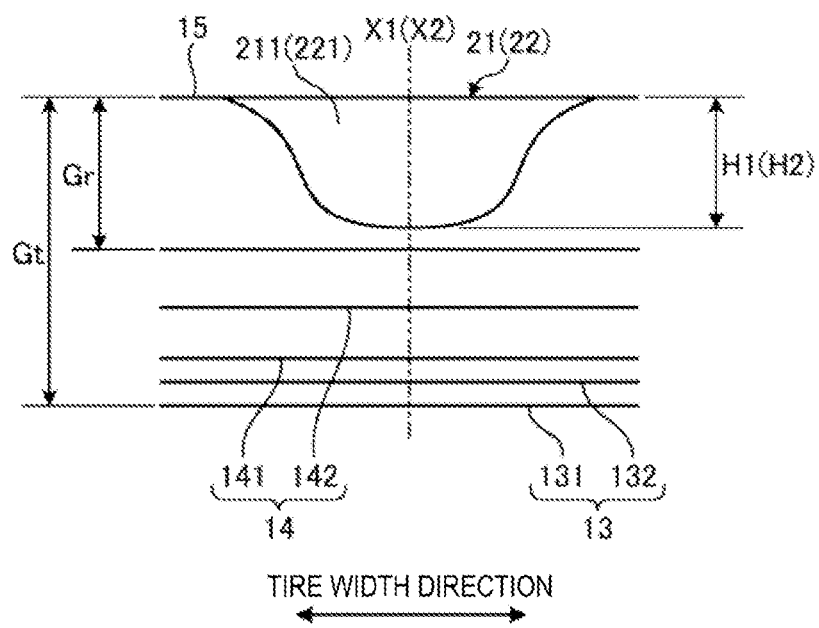
FIG. 3 is a cross-sectional view illustrating circumferential grooves illustrated in FIG. 2.

FIG. 2 is a plan view illustrating a tread surface of the tire 1 illustrated in FIG. 1. FIG. 3 is a cross-sectional view illustrating a circumferential groove 21 (22) illustrated in FIG. 2. In the drawings, "tire circumferential direction" refers to a direction around the tire rotation axis. Additionally, reference sign T denotes a tire ground contact edge, and dimension symbol TW denotes a tire ground contact width.

As illustrated in FIG. 2, the tire 1 is provided with first and second circumferential grooves 21, 22 in the tread surface. Additionally, as described below, the tire 1 includes no other circumferential grooves or dimples in the tread surface.

The first and second circumferential grooves 21, 22 include a plurality of groove portions 211, 221 arranged discontinuously in a row in the tire circumferential direction, thus extending intermittently in the tire circumferential direction.

Specifically, the plurality of groove portions 211 constituting the first circumferential groove 21 are arranged discontinuously in a row in the tire circumferential direction along a predetermined imaginary line X1 that is parallel with a tire equatorial plane CL. Additionally, the distance of the center of gravity of all of the groove portions 211 with respect to the imaginary line X1 (dimension symbol omitted in the drawings) is in the range of less than 0.5% of the tire ground contact width TW. In other words, a group of groove portions 211 that satisfies the conditions for the distance described above with respect to the predetermined imaginary line X1 constitutes one row of the first circumferential groove 21. In addition, the imaginary line X1 is defined as the groove center line of the first circumferential groove 21.

Similarly, the plurality of groove portions 221 that constitute the second circumferential groove 22 are arranged discontinuously in a row in the tire circumferential direction along a predetermined imaginary line X2 that is parallel with the tire equatorial plane CL. Additionally, the distance of the center of gravity of all of the groove portions 221 with respect to the imaginary line X2 (dimension symbol omitted in the drawings) is in the range of less than 0.5% of the tire ground contact width TW. In other words, a group of groove portions 221 that satisfies the conditions for the distance described above with respect to the predetermined imaginary line X2 constitutes one row of the second circumferential groove 22. Furthermore, this imaginary line X2 is defined as the groove center line of the second circumferential groove 22.

The distance of the center of gravity of the groove portion 211 and the distance of the center of gravity of the groove portion 221 are measured when the tire is mounted on a specified rim, inflated to a specified internal pressure, and in an unloaded state.

Additionally, a distance D1 from the tire equatorial plane CL to the groove center line X1 of the first circumferential groove 21 is substantially equal to a distance D2 from the second circumferential groove 22 to the groove center line X2. Accordingly, the first and second circumferential grooves 21, 22 are disposed at a substantially identical position with respect to the tire equatorial plane CL. Specifically, the distance D1 of the first circumferential groove 21 and the distance D2 of the second circumferential groove 22 have the relationship $0.90 \leq D2/D1 \leq 1.10$, and preferably have the relationship $0.95 \leq D2/D1 \leq 1.05$.

Additionally, in FIG. 2, the distances D1, D2 from the tire equatorial plane CL to the groove center lines X1, X2 of the first and second circumferential grooves 21, 22 have the relationships $0.05 \leq D1/TW \leq 0.45$ and $0.05 \leq D2/TW \leq 0.45$, and preferably have the relationships $0.10 \leq D1/TW \leq 0.25$ and $0.10 \leq D2/TW \leq 0.25$ with respect to the tire ground contact width TW. Additionally, a distance Dg in the tire width direction between the groove center line X1 of the first circumferential groove 21 and the groove center line X2 of the second circumferential groove 22 has the relationship $0.10 \leq Dg/TW$, and preferably has the relationship $0.20 \leq Dg/TW$ with respect to the tire ground contact width TW. The upper limit of the ratio Dg/TW is not particularly limited, but is restricted by other conditions.

The distance D1, the distance D2, and the distance Dg are measured when the tire is mounted on a specified rim, inflated to a specified internal pressure, and in an unloaded state.

Moreover, the maximum groove width W1 of the groove portion 211 of the first circumferential groove 21 and the maximum groove width W2 of the groove portion 221 of the second circumferential groove 22 respectively have the relationships $0.020 \leq W1/TW \leq 0.080$ and $0.020 \leq W2/TW \leq 0.080$ with respect to the tire ground contact width TW. Additionally, the maximum groove widths W1, W2 of the groove portions 211, 221 of the first and second circumferential grooves 21, 22 are in the range of 4.0 mm or more and 16 mm or less, and preferably in the range of 6.0 mm or more and 10 mm or less. In addition, the maximum groove widths W1, W2 of the groove portions 211, 221 of the first and second circumferential grooves 21, 22 have the relationship $0.90 \leq W2/W1 \leq 1.10$, and preferably have the relationship $0.95 \leq W2/W1 \leq 1.05$. Accordingly, the maximum groove widths W1, W2 of the groove portions 211, 221 of the first and second circumferential grooves 21, 22 are set to be substantially identical. Additionally, in the configuration in FIG. 2, all of the groove portions 211, 221 have a substantially identical groove width (with the exception of, for example, differences caused by manufacturing errors).

The maximum groove widths W1, W2 of the groove portions 211, 221 of the circumferential grooves 21, 22 are each measured as the distance between opposing groove walls in the groove opening portion when the tire is mounted on a specified rim, inflated to a specified internal pressure, and in an unloaded state.

Additionally, in FIG. 3, the maximum groove depth H1 of the first circumferential groove 21 and the maximum groove depth H2 of the second circumferential groove 22 are in the range of 2.5 mm or more and 5.0 mm or less, and preferably in the range of 2.8 mm or more and 4.0 mm or less. Additionally, the maximum groove depths H1, H2 of the first and second circumferential grooves 21, 22 have the relationship $0.90 \leq H2/H1 \leq 1.10$, and preferably have the relationship $0.95 \leq H2/H1 \leq 1.05$.

The maximum groove depths H21, H22 of the circumferential grooves 21, 22 are each measured as a distance from the tread contact surface to the groove bottom when the tire is mounted on a specified rim, inflated to a specified internal pressure, and in an unloaded state. Additionally, in a configuration in which a groove bottom includes partial recess/protrusion portions or a sipe, the groove depth is measured excluding the partial recess/protrusion portions or the sipe.

Additionally, in FIG. 3, the maximum groove depths H1, H2 of the first and second circumferential grooves 21, 22 are in the range of 60% or more and 85% or less and preferably in the range of 63% or more and 70% or less with respect to the gauge Gr of the tread rubber 15 on the groove center line of the circumferential grooves 21, 22. Additionally, the gauge Gr of the tread rubber 15 is in the range of 30% or more and 60% or less and preferably in the range of 35% or more and 55% or less with respect to the total gauge Gt of the tread portion on the groove center lines of the circumferential grooves 21, 22.

The gauge Gr of the tread rubber 15 is measured as a distance from a tread profile to the outer circumferential surface of the cross belt 142 and does not include the gauge of the coating rubber (not illustrated) of the cross belt 142.

The total gauge Gt of the tread portion is measured as a distance from the tread profile to the tire inner surface and does not include the gauge of the tread surface or partial recess/protrusion portions formed on the tire inner surface.

Additionally, in FIG. 2, a groove area A1 of the first circumferential groove 21 and a groove area A2 (not illustrated) of the second circumferential groove 22 have the relationships $0.015 \leq A1/Sa \leq 0.100$ and $0.015 \leq A2/Sa \leq 0.100$, and preferably have the relationships $0.015 \leq A1/Sa \leq 0.020$ and $0.015 \leq A2/Sa \leq 0.020$, with respect to an area Sa of the tire ground contact region. Additionally, the groove area A1 of the first circumferential groove 21 and the groove area A2 of the second circumferential groove 22 have the relationship $0.90 \leq A1/A2 \leq 1.10$, and preferably have the relationship $0.95 \leq A1/A2 \leq 1.05$.

The groove area is the opening area of a groove in the tread contact surface, and is measured at a contact surface between the tire and a flat plate when the tire is mounted on a specified rim, inflated to a specified internal pressure, placed vertically on the flat plate in a static state, and loaded with a load corresponding to a specified load. Additionally, in a case where the circumferential groove 21, 22 extends intermittently in the tire circumferential direction as in FIG. 2, the groove area A1, A2 of the circumferential groove 21, 22 is calculated as the sum of the opening areas of the plurality of groove portions 211, 221 constituting the circumferential groove 21, 22.

The area Sa of the tire ground contact region is the area of the entire region of the tread contact surface defined by left and right tire ground contact edges T, and is defined as an area including both the groove and the land portion.

Additionally, in the configuration in FIG. 2, each of the first and second circumferential grooves 21, 22 includes a plurality of groove portions 211, 221 arranged discontinuously in a row in the tire circumferential direction, as described above. Additionally, each of the opening areas of the groove portions 211, 221 constituting the first and second circumferential grooves 21, 22 is in the range of 200 mm$^2$ or more and 340 mm$^2$ or less, and preferably in the range of 240 mm$^2$ or more and 300 mm$^2$ or less.

Additionally, preferably the tire 1 has a tire ground contact region that does not include other grooves or recess portions each having an opening area of more than 40 mm$^2$, preferably more than 20 mm$^2$, that is, grooves or recess portions other than the circumferential grooves 21, 22. In other words, the regions other than the regions where the circumferential grooves 21, 22 are disposed may be provided in the tire ground contact region with wear indicators (not illustrated) each including a recess portion or groove with an opening area smaller than that indicated in the above-described conditions, for example, a small hole. Additionally, the groove area ratio of the tire ground contact region is in the range of 3.0% or more and 5.0% or less, and preferably in the range of 3.2% or more and 3.8% or less.

For example, in the configuration in FIG. 2, the tire ground contact region includes only the first and second circumferential grooves 21, 22, and a wear indicator (not illustrated) is formed in the groove bottoms of predetermined circumferential grooves 21, 22. Additionally, the regions other than the regions where the circumferential grooves 21 and 22 are disposed include a plane road contact surface with no grooves or sipes. Thus, in the configuration in FIG. 2, the groove area across the tire ground contact region is equal to the sum of the groove area A1 of the first circumferential groove 21 and the groove area A2 of the second circumferential groove 22. Additionally, the groove area ratio of the tire ground contact region is in the range $0.030 \leq (A1+A2)/Sa \leq 0.200$.

The groove area ratio is defined as the ratio between the sum of the groove areas of the grooves disposed in a predetermined region and the area of the predetermined region.

Additionally, in the configuration in FIG. 2, a pitch length P1 of the groove portion 211 of the first circumferential groove 21 and a pitch length P2 of the groove portion 221 of the second circumferential groove 22 have the relationships $0.030 \leq P1/TL \leq 0.060$ and $0.030 \leq P2/TL \leq 0.060$ with respect to a tire circumferential length TL (not illustrated). Additionally, the pitch length P1 of the groove portion 211 of the first circumferential groove 21 and the pitch length P2 of the groove portion 221 of the second circumferential groove 22 have the relationship $0.90 \leq P1/P2 \leq 1.10$, and preferably have the relationship $0.95 \leq P1/P2 \leq 1.05$.

The tire circumferential length TL is measured as the maximum circumferential length of the tread surface when the tire is mounted on a specified rim, inflated to a specified internal pressure, and in an unloaded state.

Additionally, in FIG. 2, the maximum circumferential length L1 of the groove portion 211 of the first circumferential groove 21 and the maximum circumferential length L2 of the groove portion 221 of the second circumferential groove 22 have the relationships $0.30 \leq L1/P1 \leq 0.60$ and $0.30 \leq L2/P2 \leq 0.60$, and preferably have the relationships $0.45 \leq L1/P1 \leq 0.55$ and $0.45 \leq L2/P2 \leq 0.55$, and more preferably have the relationships $0.48 \leq L1/P1 \leq 0.52$ and $0.48 \leq L2/P2 \leq 0.52$ with respect to the pitch length P1 of the groove 211 of the first circumferential groove 21 and the pitch length P2 of the groove 221 of the second circumferential groove 22. In addition, a maximum circumferential length L1 of the groove portion 211 of the first circumferential groove 21 and a maximum circumferential length L2 of the groove portion 221 of the second circumferential groove 22 have the relationship $0.90 \leq L2/L1 \leq 1.10$, and preferably have the relationship $0.95 \leq L2/L1 \leq 1.05$. In addition, in the configuration in FIG. 2, all of the groove portions 211, 221 have a substantially identical circumferential length (with the exception of, for example, differences caused by manufacturing errors).

The maximum circumferential lengths L1, L2 of the groove portions 211, 221 of the circumferential grooves 21, 22 are each measured as a circumferential distance in the groove opening portion when the tire is mounted on a specified rim, inflated to a specified internal pressure, and in an unloaded state.

Additionally, in FIG. 2, the maximum circumferential length L1 of the groove portion 211 of the first circumferential groove 21 and the maximum circumferential length L2 of the groove portion 221 of the second circumferential groove 22 have the relationships $2.00 \leq L1/W1 \leq 8.00$ and $2.00 \leq L2/W2 \leq 8.00$, and preferably have the relationships $4.00 \leq L1/W1 \leq 6.00$ and $4.00 \leq L2/W2 \leq 6.00$ with respect to the maximum groove width W1 of the first circumferential groove 21 and the maximum groove width W2 of the second circumferential groove 22.

Additionally, in FIG. 2, the phase difference y between the groove portion 211 of the first circumferential groove 21 and the groove portion 221 of the second circumferential groove 22 has the relationship $0.25 \leq p/P1 \leq 0.75$ and preferably has the relationship $0.40 \leq p/P1 \leq 0.50$ with respect to the pitch length P1 of the groove portion 211 of the first circumferential groove 21.

For example, in the configuration in FIG. 2, the groove portions 211, 221 have a rectangular shape or an elliptical shape that is elongated in the tire circumferential direction. Additionally, the groove portions 211 of the first circumferential groove 21 and the groove portions 221 of the second circumferential groove 22 are arranged in a staggered manner in the tire circumferential direction. Specifically, the pitch number of the groove portions 211 of the first circumferential groove 21 and the pitch number of the groove portions 221 of the second circumferential groove 22 are set to be identical, and the maximum circumferential length L1 of the groove portion 211 of the first circumferential groove 21 and the maximum circumferential length L2 of the groove portion 221 of the second circumferential groove 22 are set to be 50% of the pitch length P1 of the groove portion 211 of the first circumferential groove 21 and the pitch length P2 of the groove portion 221 of the second circumferential groove 22. Additionally, the phase difference y between the groove portion 211 of the first circumferential groove 21 and the groove portion 221 of the second circumferential groove 22 is set to be approximately 50% of the pitch length P1 of the groove portion 211 of the first circumferential groove 21.

Effect

As described above, the tire 1 includes the first circumferential groove 21 and the second circumferential groove 22 disposed in the left region and the right region demarcated by the tire equatorial plane CL (see FIG. 2). Additionally, each of the first circumferential groove 21 and the second circumferential groove 22 includes the plurality of groove portions 211, 221 arranged discontinuously in a row and in the tire circumferential direction. In addition, the groove portions 211 of the first circumferential groove 21 and the groove portions 221 of the second circumferential groove 22 are arranged in a staggered manner in the tire circumferential direction. Additionally, the distance D1 from the tire equatorial plane CL to the groove center line X1 of the first circumferential groove 21 and the distance D2 from the second circumferential groove 22 to the groove center line X2 have the relationship $0.90 \leq D2/D1 \leq 1.10$. In addition, the maximum groove width W1 of the groove portion 221 of the first circumferential groove 21 and the maximum groove width W2 of the groove portion 221 of the second circumferential groove 22 have the relationship $0.90 \leq W2/W1 \leq 1.10$. Additionally, the maximum circumferential length L1 of the groove portion 211 of the first circumferential groove 21 and the maximum circumferential length L2 of the groove portion 221 of the second circumferential groove 22 have the relationship $0.90 \leq L2/L1 \leq 1.10$.

In such a configuration, (1) each of the first and second circumferential grooves 21, 22 extends intermittently in the tire circumferential direction, and thus compared with a configuration in which the circumferential grooves extend continuously in the tire circumferential direction (see FIG. 6), the configuration described above has an advantage in that the traction performance of the tire is improved. Additionally, (2) the first and second circumferential grooves 21, 22 are disposed at the distances D1, D2 that are substantially identical, to the tire equatorial plane CL, and thus compared with a configuration in which the first and second circumferential grooves are disposed left-right asymmetrically (not illustrated), the configuration described above has an advantage in that for example, the average travel time is stable on a traveling course such as a circuit which requires cornering in both left and right directions. Additionally, (3) the groove portions 211, 221 constituting the first and second circumferential grooves 21, 22 have the maximum groove widths W1, W2 that are substantially identical and the maximum circumferential lengths L1, L2 that are substantially identical, and thus, compared with a configuration in which the groove portions have non-uniform groove widths and groove lengths (not illustrated), the configuration described above has an advantage in that for example, the average travel time is stable on the traveling course such as a circuit which requires cornering in both left and right directions.

Additionally, in the tire 1, the maximum groove width W1 of the groove portion 211 of the first circumferential groove 21 and the maximum groove width W2 of the groove portion 221 of the second circumferential groove 22 have the relationship $0.020 \leq W1/TW \leq 0.080$ and $0.020 \leq W2/TW \leq 0.080$ with respect to the tire ground contact width TW (see FIG. 2). The lower limit described above has the advantage of ensuring drainage properties of the circumferential grooves 21, 22. Additionally, the upper limit has the advantage of suppressing degradation of the traction performance due to excessively wider circumferential grooves 21, 22.

In addition, in the tire 1, the maximum groove depths H1, H2 of the groove portions 211, 221 of the first and second circumferential grooves 21, 22 are in the range of 2.5 mm or more and 5.0 mm or less. This has the advantage of appropriately setting the maximum groove depths H1, H2 of the circumferential grooves 21, 22.

Additionally, in the tire 1, the groove area A1 of the first circumferential groove 21 and the groove area A2 of the second circumferential groove 22 have the relationships $0.015 \leq A1/Sa \leq 0.020$ and $0.015 \leq A2/Sa \leq 0.020$ with respect to the area Sa of the tire ground contact region. This has the advantage of appropriately setting the groove areas A1, A2 of the circumferential grooves 21, 22.

Additionally, in the tire 1, no other grooves or recess portions having an opening area greater than 40 mm² are provided in the tire ground contact region (see FIG. 2). This has the advantage of ensuring the ground contact area of the tire and appropriately ensuring the effect of improving the traction performance of the tire described above.

Additionally, in the tire 1, the groove area ratio of the tire ground contact region is in the range of 3.0% or more and 5.0% or less. This has the advantage of ensuring the traction characteristics of the tire, especially a race tire.

Additionally, in the tire 1, a distance Dg in the tire width direction between the groove center line X1 of the first circumferential groove 21 and the groove center line X2 of the second circumferential groove 22 has the relationship $0.10 \leq Dg/TW \leq 0.90$ with respect to the tire ground contact width TW (see FIG. 2). This lower limit has the advantage of ensuring the distance Dg between the circumferential grooves 21, 22 adjacent to each other to improve the dry steering stability performance of the tire and also suppressing uneven wear of ribs defined by the circumferential grooves 21, 22 adjacent to each other. The upper limit described above has the advantage of suppressing degradation of wet performance caused by an excessively short distance from each of the circumferential grooves 21, 22 to the tire ground contact edge T.

Additionally, in the tire 1, the tire cross-sectional height SH has the relationship $0.20 \leq SH/SW \leq 0.70$ with respect to the total tire width SW, and the tire ground contact width TW has the relationship 0.90≤TW/SW≤0.98 with respect to the total tire width SW (see FIG. 1). This has the advantage of appropriately setting the aspect ratio SH/SW of the tire and the tire ground contact width TW.

Additionally, the tire 1 includes the pair of bead cores 11, 11, the carcass layer 13 extended across the pair of bead cores 11, 11, the pair of cross belts 141, 142 disposed on the outer circumference of the carcass layer 13, and the tread rubber 15 disposed on the outer side of the cross belts 141, 142 in the radial direction (see FIG. 1). Additionally, the width Wb of the wider cross belt of the pair of cross belts 141, 142 (the cross belt 141 on the inner diameter side in FIG. 1) has the relationship 0.98≤Wb/TW≤1.10 with respect to the tire ground contact width TW. As a result, there is an advantage that the durability of the tire is appropriately secured.

Additionally, the tire 1 includes the pair of bead cores 11, 11, the carcass layer 13 extended across the pair of bead cores 11, 11, the pair of cross belts 141, 142 disposed on the outer circumference of the carcass layer 13, and the tread rubber 15 disposed on the outer side of the cross belts 141, 142 in the radial direction (see FIG. 1). Additionally, the gauge Gr of the tread rubber 15 is in the range of 30% or more and 60% or less with respect to the total gauge Gt of the tread portion on the groove center lines of the first and second circumferential grooves 21, 22 (see FIG. 3). This has the advantage of appropriately setting the gauge Gr of the tread rubber 15.

EXAMPLES

Figure 6:
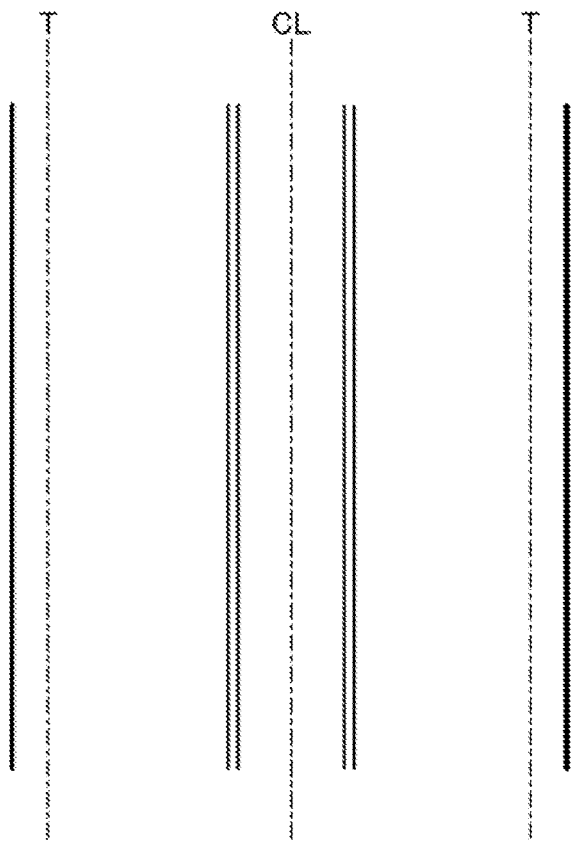
FIG. 6 is an explanatory diagram illustrating a test tire of Conventional Example illustrated in FIG. 4.

FIGS. 4 and 5 are tables indicating the results of performance tests of tires according to an embodiment of the technology. FIG. 6 is an explanatory diagram illustrating a test tire of the Conventional Example illustrated in FIG. 4.

In the performance tests, the (1) dry performance and (2) wet performance were evaluated for a plurality of types of test tires. Additionally, a test tire having a tire size of P205/50R15 84W was assembled on a rim specified by JATMA, and mounted on all wheels of a four-wheeled passenger car having a weight of 990 [kg]. In addition, the test tires were inflated to an internal pressure of 160 kPa in the cold and to an internal pressure of 220 kPa in the warm.

In the evaluation related to dry performance, the test vehicle ran four laps of a predetermined circuit of 3.7 km in an environment with clear weather, a road surface temperature of 18° C., and a temperature 28° C., and the lap times were measured. The best lap time was used to express the results as index values for evaluation, with Conventional Example being assigned as the reference (100). In this evaluation, larger values are preferable. Moreover, an evaluation value of 99 or more indicates that the performance is appropriately maintained.

In the evaluation related to the wet performance, the test vehicle ran four laps of the circuit of 3.7 km, sprinkled with water to a water depth of 1 mm, and the lap time was measured. The best lap time was used to express the results as index values for evaluation, with Conventional Example being assigned as the reference (100). In this evaluation, larger values are preferable. Moreover, an evaluation value of 99 or more indicates that the performance is appropriately maintained.

The test tires of the Examples have the configuration illustrated in FIGS. 1 to 3, and each of the first and second circumferential grooves 21, 22 includes a plurality of groove portions 211, 221 arranged discontinuously in a row in the tire circumferential direction. Additionally, the tire outer diameter is 586 mm, the tire cross-sectional height SH is 103 mm, the total tire width SW is 216 mm, the tire ground contact width TW is 202 mm, and the belt width Wb of the wider cross belt 142 is 203 mm. Additionally, the gauge Gr of the tread rubber 15 on the groove center lines X1 and X2 of the circumferential grooves 21, 22 is in the range of 4.0 mm to 4.7 mm, and the total gauge Gt of the tread portion is in the range of 10 mm to 11 mm. Additionally, the groove widths W1, W2 of the first and second circumferential grooves 21, 22 have the relationship W1=W2, and the groove depths H1, H2 are such that H1=H2=3.3 mm.

The test tire of Conventional Example has the configuration illustrated in FIG. 6, and differs from the test tire of Example 1 in that the first and second circumferential grooves extend continuously in the tire circumferential direction.

As can be seen from the test results, the test tires of Examples provide dry performance and wet performance of a tire in a compatible manner.

The invention claimed is:

1. A tire, the tire being a racing pneumatic radial tire configured both for public road running and for circuit running, the tire comprising:
   a first circumferential groove and a second circumferential groove disposed in a left region and a right region demarcated by a tire equatorial plane,
   each of the first circumferential groove and the second circumferential groove comprising a plurality of groove portions arranged discontinuously in a row in a tire circumferential direction,
   the groove portions of the first circumferential groove and the groove portions of the second circumferential groove being arranged in a staggered manner in the tire circumferential direction,
   a distance D1 from the tire equatorial plane to a groove center line of the first circumferential groove and a distance D2 from the tire equatorial plane to a groove center line of the second circumferential groove having a relationship 0.90≤D2/D1≤1.10,
   a maximum groove width W1 of the first circumferential groove and a maximum groove width W2 of the second circumferential groove having a relationship 0.90≤W2/W1≤1.10,
   a maximum circumferential length L1 of the groove portions of the first circumferential groove and a maximum circumferential length L2 of the groove portions of the second circumferential groove having a relationship 0.90≤L2/L1≤1.10, and
   each of opening areas of the plurality of groove portions constituting the first and second circumferential grooves is in a range of 200 mm² or more and 340 mm² or less, wherein
   a tire cross-sectional height SH has a relationship 0.20≤SH/SW≤0.70 with respect to a total tire width SW,
   a tire ground contact width TW has a relationship 0.90≤TW/SW≤0.98 with respect to the total tire width SW,
   a maximum groove depth H1 of the first circumferential groove has a relationship 2.5 mm≤H1≤5.0 mm,
   a maximum groove depth H2 of the second circumferential groove has a relationship 2.5 mm≤H2≤5.0 mm, and
   a distance Dg in a tire width direction between the groove center line of the first circumferential groove and the groove center line of the second circumferential groove has a relationship $0.10 \leq Dg/TW \leq 0.90$ with respect to a tire ground contact width TW.

2. The tire according to claim 1, wherein the maximum groove width W1 of the groove portions of the first circumferential groove and the maximum groove width W2 of the groove portions of the second circumferential groove have relationships $0.020 \leq W1/TW \leq 0.080$ and $0.020 \leq W2/TW \leq 0.080$ with respect to the tire ground contact width TW.

3. The tire according to claim 2, wherein a groove area A1 of the first circumferential groove and a groove area A2 of the second circumferential groove have relationships $0.015 \leq A1/Sa \leq 0.020$ and $0.015 \leq A2/Sa \leq 0.020$ with respect to an area Sa of a tire ground contact region.

4. The tire according to claim 3, wherein no other grooves or recess portions having an opening area greater than 40 mm² are provided in the tire ground contact region.

5. The tire according to claim 4, wherein a groove area ratio of the tire ground contact region is in a range of 3.0% or more and 5.0% or less.

6. The tire according to claim 5, comprising a pair of bead cores, a carcass layer extended across the pair of bead cores, a pair of cross belts disposed on an outer circumference of the carcass layer, and a tread rubber disposed on an outer side of the cross belts in a radial direction, wherein
a width Wb of a wider cross belt of the pair of cross belts has a relationship $0.98 \leq Wb/TW \leq 1.10$ with respect to the tire ground contact width TW.

7. The tire according to claim 6, wherein a gauge of the tread rubber is in a range of 30% or more and 60% or less with respect to a total gauge of a tread portion on the groove center lines of the first and second circumferential grooves.

8. The tire according to claim 1, wherein a groove area A1 of the first circumferential groove and a groove area A2 of the second circumferential groove have relationships $0.015 \leq A1/Sa \leq 0.020$ and $0.015 \leq A2/Sa \leq 0.020$ with respect to an area Sa of a tire ground contact region.

9. The tire according to claim 1, wherein no other grooves or recess portions having an opening area greater than 40 mm² are provided in a tire ground contact region.

10. The tire according to claim 1, wherein a groove area ratio of a tire ground contact region is in a range of 3.0% or more and 5.0% or less.

11. The tire according to claim 1, comprising a pair of bead cores, a carcass layer extended across the pair of bead cores, a pair of cross belts disposed on an outer circumference of the carcass layer, and a tread rubber disposed on an outer side of the cross belts in a radial direction, wherein
a width Wb of a wider cross belt of the pair of cross belts has a relationship $0.98 \leq Wb/TW \leq 1.10$ with respect to the tire ground contact width TW.

12. The tire according to claim 1, comprising a pair of bead cores, a carcass layer extended across the pair of bead cores, a pair of cross belts disposed on an outer circumference of the carcass layer, and a tread rubber disposed on an outer side of the cross belts in a radial direction, wherein
a gauge of the tread rubber is in a range of 30% or more and 60% or less with respect to a total gauge of a tread portion on the groove center lines of the first and second circumferential grooves.

13. The tire according to claim 1, wherein the tire ground contact width TW with respect to the total tire width SW satisfies $0.94 \leq TW/SW \leq 0.98$.

14. A tire comprising:
a first circumferential groove and a second circumferential groove disposed in a left region and a right region demarcated by a tire equatorial plane,
each of the first circumferential groove and the second circumferential groove comprising a plurality of groove portions arranged discontinuously in a row in a tire circumferential direction,
the groove portions of the first circumferential groove and the groove portions of the second circumferential groove being arranged in a staggered manner in the tire circumferential direction,
a distance D1 from the tire equatorial plane to a groove center line of the first circumferential groove and a distance D2 from the tire equatorial plane to a groove center line of the second circumferential groove having a relationship $0.90 \leq D2/D1 \leq 1.10$,
a maximum groove width W1 of the first circumferential groove and a maximum groove width W2 of the second circumferential groove having a relationship $0.90 \leq W2/W1 \leq 1.10$,
a maximum circumferential length L1 of the groove portions of the first circumferential groove and a maximum circumferential length L2 of the groove portions of the second circumferential groove having a relationship $0.90 \leq L2/L1 \leq 1.10$,
each of opening areas of the plurality of groove portions constituting the first and second circumferential grooves is in a range of 200 mm² or more and 340 mm² or less, and
the maximum circumferential length L1 of the groove portions of the first circumferential groove and the maximum circumferential length L2 of the groove portions of the second circumferential groove have relationships $0.30 \leq L1/P1 \leq 0.60$ and $0.30 \leq L2/P2 \leq 0.60$ with respect to a pitch length P1 of the groove portions of the first circumferential groove and the pitch length P2 of the groove portions of the second circumferential groove, wherein
a maximum groove depth H1 of the first circumferential groove has a relationship $2.5 \text{ mm} \leq H1 \leq 5.0 \text{ mm}$,
a maximum groove depth H2 of the second circumferential groove has a relationship $2.5 \text{ mm} \leq H2 \leq 5.0 \text{ mm}$, and
a distance Dg in a tire width direction between the groove center line of the first circumferential groove and the groove center line of the second circumferential groove has a relationship $0.10 \leq Dg/TW \leq 0.90$ with respect to a tire ground contact width TW.

15. The tire according to claim 14, wherein no other grooves or recess portions having an opening area greater than 40 mm² are provided in a tire ground contact region.

16. A tire comprising:
a first circumferential groove and a second circumferential groove disposed in a left region and a right region demarcated by a tire equatorial plane,
each of the first circumferential groove and the second circumferential groove comprising a plurality of groove portions arranged discontinuously in a row in a tire circumferential direction,
the groove portions of the first circumferential groove and the groove portions of the second circumferential groove being arranged in a staggered manner in the tire circumferential direction,
a distance D1 from the tire equatorial plane to a groove center line of the first circumferential groove and a distance D2 from the tire equatorial plane to a groove center line of the second circumferential groove having a relationship $0.90 \leq D2/D1 \leq 1.10$, a maximum groove width W1 of the first circumferential groove and a maximum groove width W2 of the second circumferential groove having a relationship $0.90 \leq W2/W1 \leq 1.10$, a maximum circumferential length L1 of the groove portions of the first circumferential groove and a maximum circumferential length L2 of the groove portions of the second circumferential groove having a relationship $0.90 \leq L2/L1 \leq 1.10$, each of opening areas of the plurality of groove portions constituting the first and second circumferential grooves is in a range of 200 mm² or more and 340 mm² or less, and a groove area ratio of a tire ground contact region is in a range of 3.0% or more and 5.0% or less, wherein a maximum groove depth H1 of the first circumferential groove has a relationship $2.5 \text{ mm} \leq H1 \leq 5.0 \text{ mm}$, a maximum groove depth H2 of the second circumferential groove has a relationship $2.5 \text{ mm} \leq H2 \leq 5.0 \text{ mm}$, and a distance Dg in a tire width direction between the groove center line of the first circumferential groove and the groove center line of the second circumferential groove has a relationship $0.10 \leq Dg/TW \leq 0.90$ with respect to a tire ground contact width TW.

17. The tire according to claim 16, wherein no other grooves or recess portions having an opening area greater than 40 mm² are provided in a tire ground contact region.

* * * * *